April 1, 1969  H. H. WAGNER  3,435,813
ENGINE SAFETY CONTROLS
Filed Oct. 9, 1967

INVENTOR.
HAROLD H. WAGNER

BY
Fryer, Tjensvold, Feix, Phillips + Lempio
ATTORNEYS

United States Patent Office

3,435,813
Patented Apr. 1, 1969

3,435,813
ENGINE SAFETY CONTROLS
Harold H. Wagner, Peoria, Ill., assignor to Caterpillar Tractor Co., Peoria, Ill., a corporation of California
Filed Oct. 9, 1967, Ser. No. 673,727
Int. Cl. F02d 1/04, 1/06; F02b 41/10
U.S. Cl. 123—140         5 Claims

ABSTRACT OF THE DISCLOSURE

Engine safety controls to reduce engine output in case of excessive coolant temperature or air cleaner blockage. A pressure responsive assembly tends to override the engine governor but is urged out of overriding relation by pressure from the engine inlet manifold. A regulator valve is disposed between the pressure responsive assembly and the manifold. The regulator vents manifold pressure from the pressure responsive assembly so that it overrides the governor and reduces engine output in response to means sensing reduction of inlet air pressure and means sensing a preselected temperature level in the engine coolant.

CROSS-REFERENCE TO RELATED U.S. PATENTS

A preferred embodiment of the present invention is described below with a governor arrangement as set forth in U.S. Patent No. 2,767,700, issued Oct. 23, 1956, to John H. Parks and assigned to the assignee of the present invention.

BACKGROUND OF THE INVENTION

The present invention provides apparatus for regulating engine output in response to excessive temperature in a portion of the engine or substantial blockage in its air inlet. As is well known in the engine art, excessive temperature in the engine coolant or lubricant indicates impending damage to the engine. An air inlet restriction imposes an added load to the engine due to the engine working harder to acquire necessary air. Overheating and possible damage to the engine may result from continued operation. Air inlet blockage normally occurs in the air inlet cleaner and is particularly noticeable with engines employed upon earth moving machinery which normally operate in dirty or dusty environment.

It is well known to provide instruments such as visual temperature indicators to warn the operator of overheating. Since the operator may fail to observe such warnings, it has also become well known to provide means which completely shut down the engine as a safety measure in case of excessive heating or oil pressure failure, for example. However, complete engine shut down may strand the vehicle in a location where repairs are not readily available. Moreover, unexpected shut down and ensuing loss of operator control in vehicles such as earthmoving machinery could result in damage to the machine and harm to the operator.

The present invention overcomes this problem by reducing engine output upon the sensing of possibly harmful conditions in the engine. The operator is notified of the condition but does not lose complete operating control. He may still move the vehicle to a suitable repair site. Moreover, the present invention affords positive means for decreasing the possibility of engine damage by automatically reducing engine output.

Accordingly, it is an object of the present invention to provide means for automatically regulating engine speed upon the sensing of air inlet blockage and/or excessive temperature in a portion of the engine.

Figure 1:
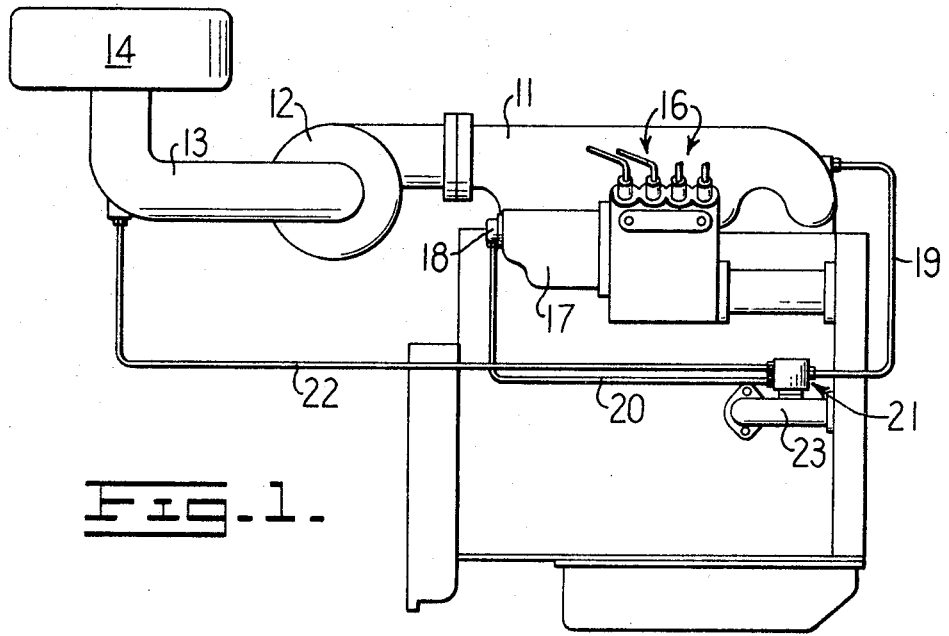
Figure 2:
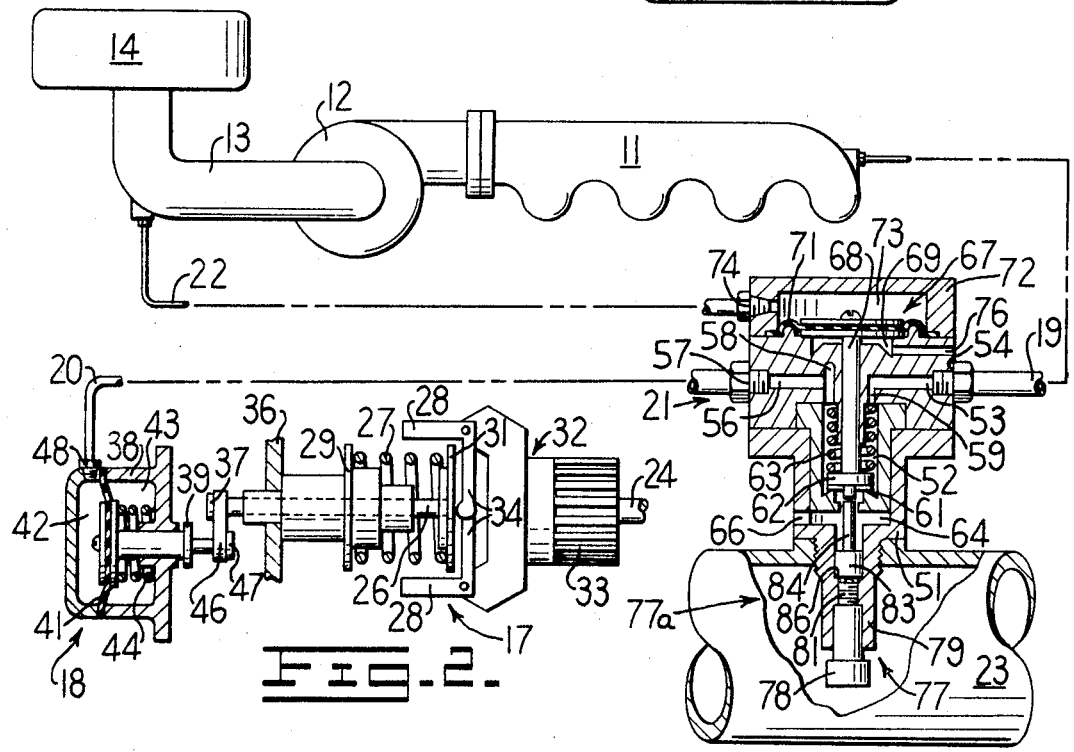

Additionally, advantages and objects of the present invention are made apparent in the following description and the accompanying drawings wherein:

FIG. 1 is a side elevation view of an engine assembly including the present invention; and FIG. 2 is a fragmentary illustration, with parts in section, of the sensing means and regulating means provided by the present invention.

An engine is illustrated in FIG. 1 as havig an air inlet manifold 11 which receives air by means of a supercharger 12, an air inlet duct 13 and an air cleaner 14 which may contain a filter (not shown). The engine shown has four cylinders, not shown, and as many fuel pumps and conduits generally indicated at 16 direct fuel to the combustion chambers of the cylinders in a well known manner and governed by a governor mechanism in a housing 17. As described in U.S. Patent No. 2,767,700, pressure responsive means 18 are associated with the governor. The pressure responsive means are spring loaded so that they tend to override the governor, reduce the rate of fuel flow to the engine and reduce engine output. Conduits 19 and 20 communicate the inlet manifold with the override 18. Inlet manifold pressure acts against the spring load, urges the limiting means out of overriding relation with the governor and permits the governor to establish a normally desired fuel-air ratio for the engine.

The present invention, described together with the above components as an exemplary setting, provides a regulator valve assembly 21 disposed between the conduits 19 and 20. As will be described in greater detail below, the regulator valve normally permits manifold pressure to be communicated to the override. The regulator valve vents manifold pressure to the override in response to pressure and temperature sensing means which are preferably incorporated within the regulator valve assembly. A conduit 22 communicates the pressure sensing portion of the regulator valve with the air inlet duct 13 behind the air cleaner. Thus, the pressure sensing means detects a preselected reduction of air pressure in the inlet 13 below atmospheric pressure which is indicative of substantial blockage in the air cleaner 14. The temperature sensing means is in communication with a tube 23 which in turn communicates with the water jacket (not shown) of the engine to detect engine overheating.

Referring now to FIG. 2, the governor 17 is of a conventional type having a fuel pump rack bar, partially illustrated at 24, which is associated with a fuel pump 16 for controlling fuel flow to the combustion chambers of the engine. Longitudinal shifting of the rack bar determines the rate at which fuel is provided by the pumps and thus establishes engine speed. The governor has a thrust rod 26 connected to the rack bar for controlling its longitudinal position. The longitudinal position of the thrust rod is regulated by interaction of a spring 27 and fly weights 28. The spring 27 acts between a spring seat 29 and one side of a disc 31 secured to the thrust rod to urge the thrust rod and the rack bar rightwardly. The fly weights are pivotally supported on a fly weight assembly 32 which is driven in rotation at a speed proportional to engine speed through its gear teeth 33. As engine speed and accordingly the rotational speed of the fly weight assembly increases, the fly weights pivot outwardly so that their inwardly extending arms 34 act against the spring 27 through the disc 31 and tend to urge the thrust rod and rack bar leftwardly. Thus, the governor regulates the engine to a speed where the force exerted by the fly weights balances the force exerted by the spring 27. The thrust rod passes through the spring seat 29 and the fly weight assembly 32 for free longitudinal motion relative to both. The thrust rod extends leftwardly out of the governor housing 36 and has a flanged portion 37 at its leftwardly extending end.

The pressure responsive override 18 comprises a housing 38 which is slidingly penetrated at one end adjacent the governor by a stem 39. A flexible diaphragm 41 hermetically divides the interior of the housing into a pressure intake chamber 42 and a spring chamber 43. The stem 39 is centrally connected to the diaphragm and has a spring 44 urging it into the housing. A link 46 slidably receives both the outwardly extending end of the override stem 39 and the outwardly extending left end of the governor thrust rod 26. However, the link interacts with the thrust rod flange 37 and a similar end flange 47 on the override stem. Thus, action of the spring 44 urges the override stem leftwardly which acts upon the governor thrust rod through the link 46 to urge the thrust rod and rack bar 24 leftwardly to throttle down the engine. Conduit 19 communicates with the pressure inlet chamber 42 through a port 48 so that manifold pressure acts against the spring 44 to urge the override stem rightwardly. The strength of the override spring 44 is selected so that manifold pressure in the inlet chamber 42 is sufficient to position the override stem rightwardly to prevent overriding of the governor. In this position, the override stem flange 47 is positioned sufficiently to the right so that the governor thrust rod may be freely moved relative to the interconnecting link and override stem.

The ultimate purpose of the regulator valve 21 and its incorporated sensing means is to sense selected conditions in the engine and thereupon vent manifold pressure from the override inlet chamber 42. In this condition, the override spring 44 shifts the override stem, governor thrust rod and fuel pump rack bar leftwardly to reduce engine speed to a selected level. To accomplish this purpose, the regulator valve comprises a housing 51 defining a central chamber 52. The housing also defines an inlet passage 53 in communication with the inlet engine manifold by means of a port 54 and the conduit 19. An outlet passage 56 is formed by the housing to be in communication with the override inlet chamber 42 by means of a port 57 and the conduit 20. A cross passage 58 communicates the passage 56 with the central chamber 52. The inlet passage 53 is communicated with the central chamber 52 by means of an orifice 59 to minimize venting of air from the manifold. A valve seat 61 is formed by the housing at the base of the central chamber 52. A slidable valve member 62 is urged downwardly into closing relation with the valve seat by means of a spring 63. With the valve member closed against the valve seat under the influence of the spring 63, the regulator valve provides generally free communication of pressure from the inlet manifold 11 to the override inlet chamber 42 by means of a path comprising the central chamber 52. Another chamber 64 is formed by the valve housing below the valve seat 61 so that when the valve member 62 moves away from the valve seat 61, the central chamber 52 is in communication with the lower chamber 64. The lower chamber is vented to the atmosphere by means of a port 66 in the housing so that, when the valve is open, manifold pressure existing particularly in conduit 20 and the override inlet chamber is freely vented to the atmosphere.

To open the valve in response to blockage of the air cleaner 14, the pressure sensing means are incorporated in an upper portion of the regulator valve as indicated at 67. A stem 68 of the valve member 62 penetrates upwardly through the housing in slidable and sealing relation and extends into an upper chamber 69 also formed by the regulator valve housing. A flexible diaphragm 71 is centrally connected to the valve stem 68 and provides a heremetic closure for the stem chamber 69. The flexible diaphragm is secured in place by means of an additional portion 72 of the regulator valve housing. The housing portion 72 forms a pressure chamber 73 which is separated from the stem chamber 69 by the diaphragm. The pressure chamber 73 is in communication with the conduit 22 at 74 while the stem chamber 69 is communicated to the atmosphere by a port 76. With the above arrangement, atmospheric pressure always exists in the stem chamber 69. When the air cleaner 14 is not blocked, air pressure existing behind the cleaner in conduit 13 and in the pressure chamber 73 closely approximates atmospheric pressure. The spring 63 then controls the position of the valve member 62 into closed relation with valve seat 61. However, as blockage of the air cleaner increases, for example, from dirt or dust build-up, air pressure in conduit 13 and the pressure chamber 73 decreases and creates a pressure differential across the diaphragm 71. The strength of the spring 63 is selected so that when blockage in the air filter becomes sufficiently severe that the reduction in air intake threatens inefficient operation or damage to the engine, the differential on the diaphragm 71 overcomes the spring 63 to raise the valve member 62 and vent the central chamber 52 to the atmosphere. As described above, venting of the central chamber 52 also vents manifold pressure out of the override inlet chamber 42 and causes the governor to throttle back the engine.

The valve member 62 also opens in response to temperature sensing means indicated at 77a. A thermostatic actuator 77 of a conventional type has its temperature sensitive portion 78 in contact with water passing through the tube 23 from the engine water jacket. The thermostatic actuator is retained by an adaptor 79 in the regulator housing 51. The adaptor defines a central bore 81 extending upwardly toward the valve member 62. An expandible portion of the thermostatic actuator is disposed in the adaptor bore 81 while a piston 83 is slidably disposed in the adaptor bore above the thermostatic actuator and has its rod 84 extending upwardly to normally terminate just short of contact with the valve member 62. While the engine cooling water remains within a suitable operating temperature range, the piston 83 rests upon a shoulder 86 in the retainer bore and does not interact with the valve member. However, when the water temperature approaches a preselected level indicative of impending damage to the engine, the thermostatic actuator urges the piston 83 upwardly. The piston raises the valve member 62 to vent the central chamber 52 to the atmosphere through the port 66.

It is to be noted that when the operator becomes aware of a condition indicated by either of the sensing means, he may either make repairs immediately or first move the vehicle to a more suitable position. After the repairs have been made and the condition no longer exists in the engine, the regulator valve automatically returns to its normal condition with the valve member 62 closed, so that the engine may be operated at its optimum output according to the governor.

I claim:

1. In combination with a governor for an internal combustion engine, the governor including means for regulating the rate of fuel flow to the engine, the improvement comprising pressure responsive override means associated with a manifold of the engine which is pressurized during engine operation and with the governor, the override means normally permitting free operation of the governor regulating means, a control valve communicating the override means with the engine manifold and regulating pressurization of the override means for the manifold, and sensor means associated with the engine to detect abnormal engine operating conditions, the control valve being responsive to the sensor means for varying pressurization of the override means from the manifold and causing the override means to adjust the governor for substantially reduced fuel flow to the engine.

2. The invention of claim 1 wherein the engine includes a supercharger for supplying air under pressure to an inlet manifold of the engine, the inlet manifold being in communication with the override means via the control valve.

3. The invention of claim 1 wherein the pressure responsive override means is normally communicated with the manifold by the control valve, the control valve being responsive to the sensing means for terminating pressure communication between th emanifold and override means.

4. The invention of claim 3 wherein the sensor means comprises pressure sensing means associated with an air inlet for the engine to detect reduction of pressure therein below a preselected level and temperature sensing means for detecting an increase of temperature above a preselected level in a portion of the engine.

5. The invention of claim 4 wherein the control valve includes a valve member normally urged against a valve seat to provide a closed path between the manifold and override means, the pressure sensing means comprises a flexible diaphragm assembly communicated on one side with the engine air inlet and on its other side to the atmosphere, the diaphragm assembly being operatively connected with the valve member, the temperature sensing means being in contact with engine coolant and operatively associated with the valve member.

References Cited

UNITED STATES PATENTS

| 2,865,356 | 12/1958 | Groezinger | 123—140.3 |
| 3,077,873 | 2/1963 | Parks et al. | 123—140 |
| 3,313,283 | 4/1967 | Miller | 123—140 |

LAURENCE M. GOODRICH, *Primary Examiner.*

U.S. Cl. X.R.

60—13